United States Patent
Puttagunta et al.

(10) Patent No.: US 11,079,939 B1
(45) Date of Patent: Aug. 3, 2021

(54) DISTRIBUTING I/O Q-CONNECTIONS OF SUBSYTEMS AMONG HOSTS

(71) Applicant: Hewlett Packard Enterprise Development LP, Houston, TX (US)

(72) Inventors: Krishna Babu Puttagunta, Rocklin, CA (US); Rupin Tashi Mohan, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/947,397

(22) Filed: Jul. 30, 2020

(51) Int. Cl.
  *G06F 3/06* (2006.01)
  *G06F 9/50* (2006.01)
  *G06F 13/40* (2006.01)

(52) U.S. Cl.
  CPC ........... *G06F 3/061* (2013.01); *G06F 3/0607* (2013.01); *G06F 3/0679* (2013.01); *G06F 13/4022* (2013.01); *G06F 2213/0026* (2013.01)

(58) Field of Classification Search
  CPC ...... G06F 3/061; G06F 3/0679; G06F 3/0607; G06F 9/505; G06F 9/5083
  See application file for complete search history.

(56) References Cited

U.S. PATENT DOCUMENTS

| | | | |
|---|---|---|---|
| 10,310,745 B2 | 6/2019 | Wu et al. | |
| 10,860,511 B1* | 12/2020 | Thompson | G06F 13/28 |
| 2002/0194407 A1 | 12/2002 | Kim | |
| 2016/0216891 A1 | 7/2016 | Bester et al. | |
| 2017/0286363 A1 | 10/2017 | Joshua et al. | |
| 2019/0146675 A1* | 5/2019 | Subramanian | G06F 3/06 711/170 |
| 2019/0250845 A1 | 8/2019 | Kabra et al. | |
| 2020/0004701 A1 | 1/2020 | Subbarao et al. | |
| 2020/0073553 A1* | 3/2020 | Klein | G06F 3/0653 |
| 2020/0356396 A1* | 11/2020 | Bert | G06F 3/0671 |

OTHER PUBLICATIONS

Jones et al., "Fibre Channel SAN Workloads", Live Webcast, Fibre Channel Industry Association, Feb. 12, 2020, 52 pages.
NVM Express, Inc., "NVM Express(TM) Base Specification", Revision 1.4a, Mar. 9, 2020, 405 pages.

* cited by examiner

*Primary Examiner* — David E Martinez
(74) *Attorney, Agent, or Firm* — Hewlett Packard Enterprise Patent Department (57) ABSTRACT

Examples include distribution of I/O Q-connections of an NVMe™ subsystem among hosts that are to communicate with the NVMe™ subsystem in an NVMe™ zone of a system. Some examples receive information including a number of I/O Q-connections available at the NVMe™ subsystem, register the number of available I/O Q-connections of the NVMe™ subsystem with an NVMe™ fabric controller, determine a number of I/O Q-connections of the NVMe™ subsystem allowed to be used by each host and send to, each host, a first notification including the number of allowed I/O Q-connections of the NVMe™ subsystem to be used by the host.

20 Claims, 6 Drawing Sheets

FIG. 1

CONNECTION REGISTRATION COMMAND
(NVME™ SUBSYTEM ⟶ NVME™ FABRIC CONTROLLER)

200

PAYLOAD KEY FIELDS

| 1 | Client Type | NVMe™ Subsystem |
|---|---|---|
| 2 | NQN | NVMe™ Qualified Name |
| 3 | Interface IP address | IPv4 or IPv6 |
| 4 | Protocol Supported | RDMA (RocE v2) |
| 5 | Max I/O Q-Connections | Total number of available I/O Q-Connections |

*FIG. 2*

FIRST NOTIFICATION
(NVME™ FABRIC CONTROLLER ⟶ HOST)

300

PAYLOAD KEY FIELDS

| 1 | Message Type | Asynchronous Notification – Allowed I/O Q-Connections |
|---|---|---|
| 2 | NQN | NVME™ subsystem NQN |
| 3 | Allowed I/O Q-Connections | Total number of I/O Q-Connections of the NVME™ subsystem allowed to be used by the host |

*FIG. 3*

FIRST RESPONSE NOTIFICATION
(HOST ⟶ NVME™ FABRIC CONTROLLER)

400

PAYLOAD KEY FIELDS

| 1 | Message Type | Asynchronous Notification – Identified I/O Q-Connections |
|---|---|---|
| 2 | NQN | NVME™ subsystem NQN |
| 3 | Identified I/O Q-Connections | Total number of I/O Q-Connections of the NVME™ subsystem identified to be used by the host |

DISTRIBUTING I/O Q-CONNECTIONS OF SUBSYTEMS AMONG HOSTS

BACKGROUND

Non-volatile memory (NVM) is a type of computer memory that retains its contents across power cycles and is therefore capable of being used as storage. Compared to volatile memory that needs power to retain data, NVM may continue to store data even after computer power is turned off. With respect to NVM, NVM Express™ (NVMe™) is a storage interface specification for accessing NVM.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as coupled or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

NVMe™ is a storage interface specification for communication between hosts and storage devices (e.g., Solid State Drives (SSDs) on a PCI Express (PCIe) bus). According to the NVMe™ specification, a storage device may handle thousands of I/O operations in parallel. In order to provide this benefit to enterprise class data centers, NVMe™ may be extended over fabrics for increased scalability and shareability. In this regard, NVMe™ over fabrics (NVMe-oF™) is a flexible transport abstraction layer that provides for a consistent definition of NVMe™ over a wide range of storage networking fabrics such as Ethernet and Fibre Channel.

The storage devices compatible with the NVMe-oF™ specification may be referred to as NVMe™ subsystems herein, and may have similar form factors as standard solid-state drives (SSDs) and hard disk drives (HDDs). A host may be a computing device that may access data stored in, and write data to, one or more storage devices. In an example, the host may be a server providing data services to a plurality of clients based on the data stored at one or more of the storage devices.

The NVMe-oF™ specification defines both an interface (e.g., a register-level interface) and a command protocol used to communicate with the NVMe™ subsystems. The interface between a host and an NVMe™ subsystem may be based on several queue pairs (i.e., paired submission and completion queues) shared between the host (e.g.; including port(s) of the host(s)) and the NVMe™ subsystem (e.g., including port(s) of the NVMe™ subsystem(s)). The queue pairs may be located either in the host memory or in the memory provided by the NVMe™ subsystem. In an example, the NVMe™ specification allows up to 64K individual queue pairs, and each queue pair can have as many as 64K entries. Once the queue pairs are configured, these queue pairs may be used for almost all communication between the host and the NVMe™ subsystem using the command protocol. Every new entry may be submitted to the NVMe™ subsystem using a submission command via the submission queue. When the submission command is processed, an entry (that has been previously associated with the submission queue from which the command was retrieved) may put on the completion queue using a completion command, and an interrupt may be generated. There may be separate queue pairs for administration operations (e.g., creating and deleting queue or updating firmware on the device) and for I/O operations (e.g., Read and Write). Separate queue pairs may avoid any delay in I/O operations due to long-running administration operations. Each queue pair for I/O operations associated with (or available at) an NVMe™ subsystem may be referred to as an "I/O Q-connection" at the NVMe™ subsystem.

In a system utilizing the NVMe-oF™ specification, one or more NVMe™ subsystems (e.g., including port(s) of the NVMe™ subsystem(s)) may be configured to communicate with one or more hosts (e.g., by including port(s) of the host(s)) in different zones (i.e., NVMe™ zones). Zoning may segregate the NVMe™ subsystem(s) and host(s) into respective NVMe™ zones to restrict access between NVMe™ subsystem(s) and host(s) that are included in the same NVMe™ zone. Accordingly, zoning may prevent unauthorized access between NVMe™ subsystem(s) and host(s) that are not included in the same NVMe™ zone. In an example, zoning may be implemented using an NVMe™ fabric controller that identifies an NVMe™ zone to which a plurality of host(s) may communicate with and facilitate mapping each host to communicate with one or more NVMe™ subsystems in the NVMe™ zone. Once the mapping is completed, each host may send a connect command to establish a connection with one or more NVMe™ subsystems in the NVMe™ zone according to the mapping.

Each NVMe™ subsystem can handle a certain number of I/O Q-connections based on its resources. These I/O Q-connections may be shared among a number of hosts that access that NVMe™ subsystem in an NVMe™ zone. Each host may be allowed to request (e.g., by sending connect commands) as many I/O Q-connections as are available on a particular NVMe™ subsystem to handle I/Os. As a result, one host may be allocated to use all or most of the I/O (Q)-connections available at the NVMe™ subsystem while another host may be allocated none or only a few I/O Q-connections of the NVMe™ subsystem (e.g., a number that may not be sufficient for the other host). This disproportionate distribution of the I/O Q-connections may create unbalanced load distribution among the hosts in the NVMe™ zone which may result network congestion and impact overall performance of the system.

Examples described herein provide techniques to distribute load among hosts in a system. In particular, the techniques may provide methods for distributing a number of I/O Q-connections available at an NVMe™ subsystem, at a point in time, among a number of hosts that are to communicate with the NVMe™ subsystem in an NVMe™ zone. The techniques may use a registration command to register the number of I/O Q-connections available, at a point in time, at the NVMe™ subsystem with an NVMe™ fabric controller. The NVMe™ fabric controller may then facilitate distribution of the available I/O Q-connections among the hosts that are to communicate with the NVMe™ subsystem in a balanced manner. In some examples, the NVMe™ fabric controller may determine a number of I/O Q-connections of the NVMe™ subsystem allowed to be used by each host by distributing the available I/O Q-connections of the NVMe™ subsystem among the hosts and sending, to each host, information including the number of allowed I/O Q-connections to be used by the host. Each host may then identify a number of I/O Q-connections of the NVMe™ subsystem to be used by the host out of the number of allowed I/O Q-connections, and establish connection with the number of identified I/O Q-connections of the NVMe™ subsystem. In this manner, examples described herein may provide systems and methods that may achieve balanced load distribution among the hosts in the NVMe™ zone.

Examples are further described herein with reference to FIGS. 1-5. It should be noted that the description and figures merely illustrate the principles of the present subject matter along with examples described herein, and should not be construed as limiting the present subject matter. Although some examples may be described herein with reference to a single NVMe™ subsystem in one NVMe™ zone, examples may be utilized for several NVMe™ subsystems in one or more NVMe™ zones. Furthermore, any functionality described herein as performed by a component (e.g., an NVMe™ fabric controller, an NVMe™ subsystem or a host) of a system may be performed by at least one processing resource of the component executing instructions (stored on a machine-readable storage medium) to perform the functionalities described herein. Various implementations of the present subject matter have been described below by referring to several examples.

Figure 1:
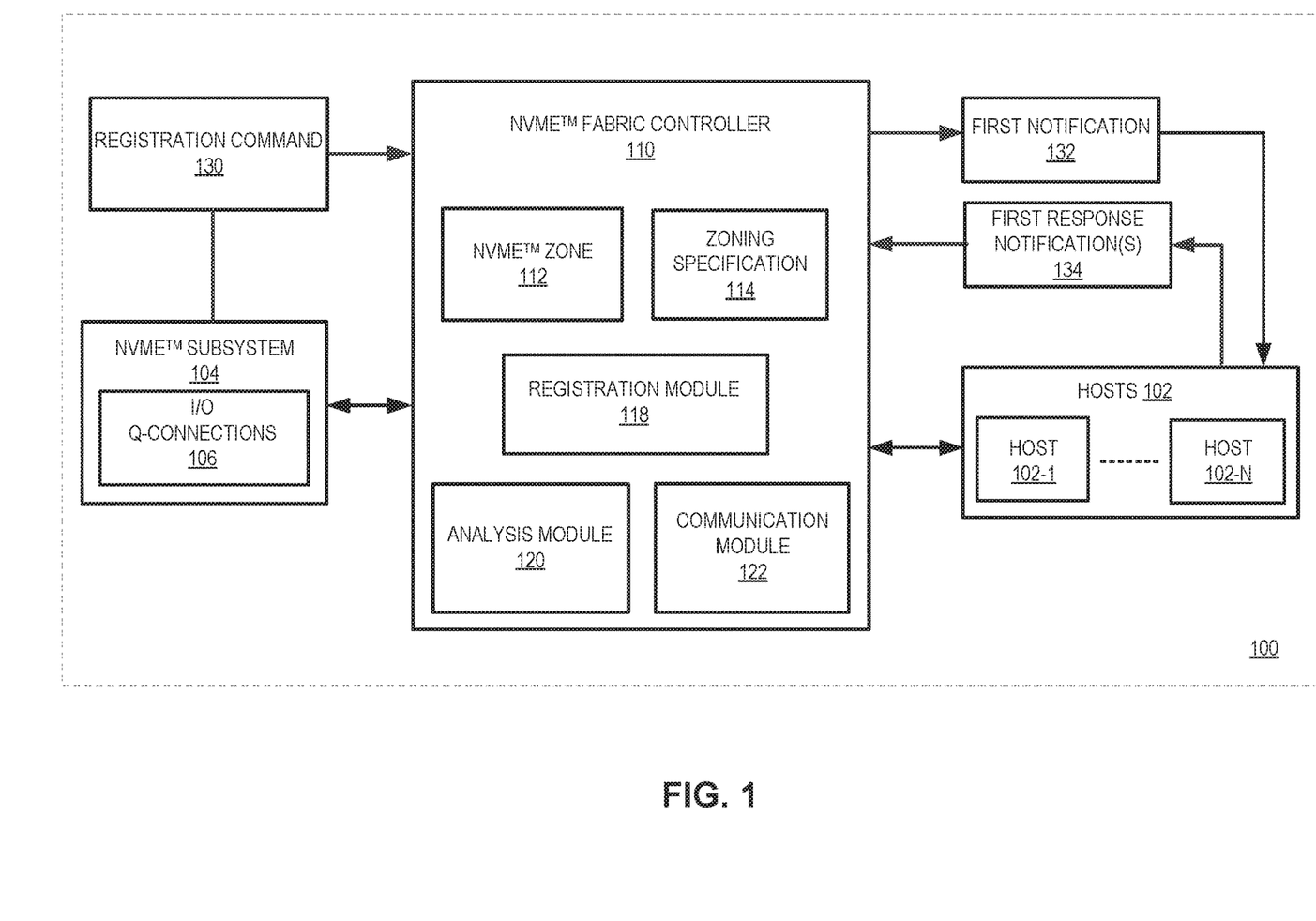
FIG. 1 is a block diagram of a system including a number of hosts and an NVMe™ subsystem, in an NVMe™ zone, connected to an NVMe™ fabric controller, in accordance with an example.

FIG. 1 illustrates an example system 100 including an NVMe™ fabric controller 110 (hereinafter also referred to as "fabric controller 110") that may facilitate connecting hosts 102 to communicate with an NVMe™ subsystem 104 in an NVMe™ zone 112. The fabric controller 110 may be attached to, be aware of, be part of, be associated with, and/or be otherwise related to a fabric (e.g., NVMe™ fabrics) to which the hosts 102 and the NVMe™ zone 112 are communicatively connected. The fabric controller 110 may include at least a processing resource communicatively coupled to a machine-readable storage medium including instructions that, when executed by the at least one processing resource, cause the fabric controller 110 to undertake certain actions. The fabric controller 110 may be a computing device, or instead be a service or application executing on one or more computing devices. In an example, the fabric controller 110 may be located either in a switch (e.g., embedded in a container); in an external virtual machine (VM), or in an NVMe™ subsystem (e.g., the NVMe™ subsystem 104).

The fabric controller 110 may facilitate connecting the hosts 102 to an NVMe™ subsystem 104 in the NVMe™ zone 112 based on zoning specifications 114. The zoning specification 114 may include a mapping that may indicate which hosts can communicate to which NVMe™ subsystem (s) of a specified NVMe™ zone. In an example, the mapping indicates that the hosts 102 can communicate with the NVMe™ subsystem 104 in the NVMe™ zone 112. For example in FIG. 1, the hosts designated 102-1, . . . , 102-N, corresponding to the NVMe™ zone 112 can communicate with the NVMe™ subsystem 104.

The zoning specification 114 may further include an indication of one or more device parameters including an NVMe™ qualified name (NQN), an Internet Protocol (IP) address associated with the NQN, a media access control (MAC) address, host transport type, or host port for each host 102. Further, the zoning specification 114 may include an indication of one or more device parameters including an NQN, an IP address associated with the NQN, an MAC address, NVMe™ subsystem transport type, or subsystem port for the NVMe™ subsystem 104.

Although FIG. 1 depicts a single NVMe™ subsystem 104 and the hosts 102 that can communicate with the NVMe™ subsystem 104 in the single NVMe™ zone 112, the system 100 may include a plurality of NVMe™ zones, each NVMe™ zone including a plurality of NVMe™ subsystems and a plurality of hosts that may communicate with one or more NVMe™ subsystems of the plurality of NVMe™ subsystems.

The fabric controller 110 may include a registration module 118, an analysis module 120 and a communication module 122 to perform one or more functionalities of the fabric controller 110 as described herein. In examples described herein, a module may be any combination of hardware and programming to implement the functionalities of the module. In some examples described herein, the combinations of hardware and programming may be implemented in a number of different ways. For example, the programming for the module may be processor executable instructions stored on a non-transitory machine-readable storage medium and the hardware for the module may include at least one processing resource (e.g., at least one processor, CPU, circuitry, etc.) to execute those instructions. In these examples, a computing device implementing such module may include the machine-readable storage medium storing the instructions and the processing resource to execute the instructions, or the machine-readable storage medium may be separately stored and accessible by the computing device and the processing resource. In some examples, the module may be implemented in circuitry.

The communication module 122 may enable receiving and sending any communication between the fabric controller 110 and each host 102, or any communication between the fabric controller 110 and the NVMe™ subsystem 104. In an example, the communication module 122 may use a transport protocol such as RDMA over Converged Ethernet v1 (RoCEv1), RoCEv2, Internet Wide-area RDMA Protocol (iWARP) or Transmission Control Protocol/Internet Protocol (TCP/IP) for exchanging messages.

In the examples described herein, the communication module 122, the NVMe™ subsystem 104 and the host(s) 102 may pass any message and/or information in terms of a notification, query and its response. In an example, TCP/IP based communication mechanism may be utilized for such purpose. Any communication between the communication module 122 and the NVMe™ subsystem 104 and between the communication module 122 and each host 102 may include forwarding a payload including the information along with a command or notification or a response to a command or notification. Furthermore, a payload communicated between the fabric controller 110 and a host of the hosts 102 may include an indication of one or more device parameters (e.g., an indication of NQN) of the NVMe™ subsystem 104 and a payload communicated between the fabric controller 10 and the NVMe™ subsystem 104 may include an indication of one or more device parameters (e.g., indication(s) of NQN(s)) of the host(s) 102, an indication of one or more device parameters (e.g., an indication of NQN) of the NVMe™ subsystem 104 or combinations thereof.

Furthermore, any notification, as described in some examples herein, from a host 102 or the NVMe™ subsystem 104 to the fabric controller 110 or vice-versa, may be an asynchronous notification. An asynchronous notification is a technique that allows a node to directly pass a message to a client connected to the node in a predefined format, rather than through a set of network codes and/or onto a queue local to the client.

The communication module 122 may receive, from the NVMe™ subsystem 104, information including a quantity of the I/O Q-connections 106 (i.e., a number of I/O Q-connections) available at the NVMe™ subsystem 104, at a point in time. In an example, the information may further include an indication of one or more device parameters of the NVMe™ subsystem 104 such as IP address, MAC address, NQN, or subsystem port. In some examples, the NVMe™ subsystem 104 may send a registration command 130, to the fabric controller 110, to register the number of available I/O Q-connections of the NVMe™ subsystem 104 with the fabric controller 110. The registration command 130 may comprise information including the number of available I/O Q-connections and the device parameter(s) of the NVMe™ subsystem 104. The registration module 118 may obtain the information including the number of available I/O Q-connections and the device parameter(s) of the NVMe™ subsystem 104 from the communication module 122. Once the registration module 118 obtains the information, the registration module 118 may register the number of available I/O Q-connections, at that point in time, with the fabric controller 110 and compile the information into a database for further processing by the fabric controller 110.

In some examples, when the NVMe™ zone 112 includes another NVMe™ subsystem, the registration module 118 may receive information (e.g., via a registration command) including a number of I/O Q-connections available at the other NVMe™ subsystem and device parameter(s) of the other NVMe™ subsystem, and compile them in the database.

In the examples described herein, once the information including the number of available I/O Q-connections of the NVMe™ subsystem 104 is received and registered with the fabric controller 110, the analysis module 120 may obtain the number of available I/O Q-connections from the registration module 118. Further, the analysis module 120 may determine a number of the hosts 102 that can communicate with the NVMe™ subsystem 104 from the zone specification 114. The analysis module 120 may then determine a number of I/O Q-connections (i.e., allowed I/O Q-connections) of the NVMe™ subsystem 104 allowed to be used by each host 102, based on the number of the hosts 102 that can communicate with the NVMe™ subsystem 104. In an example, the analysis module 120 may determine the number of allowed I/O Q-connections that can be used by each host 102 by distributing the number of available I/O Q-connections among the hosts 102. In certain examples, the analysis module 120 may determine the number of allowed I/O Q-connections by equally distributing the number of available I/O (Q)-connections among the hosts 102. In some other examples, the analysis module 120 may determine the number of allowed I/O Q-connections by distributing the number of available I/O Q-connections among the hosts 102 based on parameters such as a number of cores present in each host, a number of NVMe™ subsystems to which each host can communicate, priority level of the hosts to communicate to the NVMe™ subsystem 104 and the like.

Once the number of allowed I/O Q-connections to be used by each host 102 is determined, the communication module 122 may send, to each host 102, a first notification 132 including the number of allowed I/O Q-connections of the NVMe™ subsystem 104 to be used by the host. While sending the first notification 132, the communication module 122 may send the indication of the NQN for the NVMe™ subsystem 104. In an example, the first notification 132 may include the indication of the NQN for the NVMe™ subsystem 104. In the examples described herein, the first notification 132 may be an asynchronous notification. Each host 102 may receive and process the first notification 132. From the first notification 132, each host 102 may receive the number of allowed I/O Q-connections of the NVMe™ subsystem 104 to be used by the host.

In some other examples, the first notification 132 may include the number of available I/O Q-connections of the NVMe™ subsystem 104 and the number of the hosts 102 that are to communicate with the NVMe™ subsystem 104. The first notification 132 may also include the indication of the NQN for the NVMe™ subsystem 104. In such examples, each host 102 may determine the number of allowed I/O Q-connections to be used by the respective hosts by equally distributing the number of available I/O Q-connections of the NVMe™ subsystem 104 among the hosts 102. This way, each host 102 may determine the number of allowed I/O Q-connections to be used the host.

In some examples, the communication module 122 may send, to the NVMe™ subsystem, a notification (which may be referred to herein as a "subsystem notification") including the number of allowed I/O Q-connections of the NVMe™ subsystem 104 to be used by each host. In an example, the subsystem notification may include the indication of the NQN for each host. In the examples described herein, the subsystem notification to the NVMe™ subsystem 104 may be an asynchronous notification. By this subsystem notification, the NVMe™ subsystem 104 may know the number of allowed I/O Q-connections to be used by each host and may not accept, from a host of the hosts 102, a connect command beyond the number of allowed I/O Q-connections for the host.

Out of the number of allowed I/O Q-connections, each host 102 may identify a number of I/O Q-connections (i.e., identified I/O Q-connections) to be used by that host. A host may identify all of the allowed I/O Q-connections or a part of the allowed I/O Q-connections of the NVMe™ subsystem 104 to be used by the host. In some examples, each host 102 may identify all of the allowed I/O Q-connections of the NVMe™ subsystem 104. In some other examples, one or more hosts of the hosts 102 may identify some I/O Q-connections out of the allowed I/O Q-connections of the NVMe™ subsystem 104.

In response to the first notification 132, each host 102 may send, to the communication module 122, a first response notification 134 (e.g., an asynchronous notification) including the number of identified I/O Q-connections of the NVMe™ subsystem 104 to be used by that host. The first response notification 134 from each host 102 to the communication module 122 may further include the indication of the NQN of the NVMe™ subsystem 104. The communication module 122 may receive and process the first response notification 134 sent from each host 102. From the first response notification 134 from each host 102, the communication module 122 may determine the number of identified I/O Q-connections to be used by that host 102.

The analysis module 120 may obtain the respective numbers of identified I/O Q-connections to be used by the hosts 102 from the communication module 122 and determine whether there are any excess I/O Q-connections available at the NVMe™ subsystem 104 based on the respective numbers of identified I/O (Q)-connections to be used by the hosts 102.

In an example, the analysis module 120 may determine whether the number of identified I/O Q-connections to be used by a given host is less than the number of allowed I/O Q-connections to be used by the given host to determine a number of excess I/O Q-connections available at the NVMe™ subsystem 104. Upon determining the number of excess I/O Q-connections available at the NVMe™ subsystem 104, the analysis module 120 may further distribute the number of excess I/O Q-connections available at the NVMe™ subsystem 104 among the other hosts (except the given host) of the hosts 102. The analysis module 120 may determine a number of additional I/O Q-connections allowed to be used by each of the other hosts of the hosts 102 by distributing the number of excess I/O Q-connections available at the NVMe™ subsystem 104 among the other hosts of the hosts 102.

The communication module 122 may send a second notification including the number of additional allowed I/O Q-connections to each of the other hosts. The second notification from the communication module 122 to each of the other hosts may include the indication of the NQN of the NVMe™ subsystem 104. Depending on the requirement, each of the other hosts may identify none, all, or some I/O Q-connections out of the additional allowed I/O Q-connections and send, to the communication module 122, a second response notification including a number of additional identified I/O Q-connections to be used by that host. The second response notification from each of the other hosts to the communication module 122 may include the indication of the NQN of the NVMe™ subsystem 104. The communication module 122 may receive and process the second response notification from each of the other hosts.

Once the communication module 122 receives the second response notification from each of the other hosts, the analysis module 120 may obtain the respective numbers of additional identified I/O Q-connections to be used by the other hosts from the communication module 122. The analysis module 120 may determine a total number of identified I/O Q-connections to be used by each host 102 based on the number of identified I/O Q-connections to be used by that host 102 and the number of additional identified I/O Q-connections to be used by that host.

In some examples, the analysis module 120 may further determine whether there is any excess I/O Q-connection available at the NVMe™ subsystem 104 based on the number of additional identified I/O Q-connections to be used by each of the other hosts in the similar fashion as describe above. The process for distributing the excess I/O Q-connections (as described above) may be repeated one or more times depending on the number of additional identified I/O Q-connections to be used by one or more hosts of the other hosts. The analysis module 120 may determine a total number of identified I/O Q-connections to be used by each host 102 based on the number of identified I/O Q-connections to be used by that host and the number of additional identified I/O Q-connections to be used by that host. In some examples, the process of distributing the number of available I/O Q-connections of the NVMe™ subsystem 104 may be repeated dynamically when any change (e.g., removal or addition of a host or an NVMe™ subsystem) in the zone specification 114 occurs.

Once each host 102 has information including the total number of identified I/O Q-connections to be used by the host, each host 102 may, accordingly, send connect command(s) to establish communication with the total number of identified I/O Q-connections of the NVMe™ subsystem 104.

In an example, the fabric controller 110 may dynamically send information related to the distribution of a number of available I/O Q-connections at the NVMe™ subsystem 104, at a point in time, to the hosts 102 after a given host establishes connection with one or more I/O Q-connections of the NVMe™ subsystem 104. In some examples, in response to any change in the mapping within the NVMe™ zone 112 (e.g., removal or addition of a host or an NVMe™ subsystem), the fabric controller 110 may determine a number of available I/O (Q)-connections of one or more NVMe™ subsystems in the NVMe™ zone 112 at that point in time. The fabric controller 110 may then determine a number of allowed I/O Q-connections of each NVMe™ subsystem to be used by each host of the hosts that can communicate with the NVMe™ subsystem and send the first notification 132 including the number of allowed I/O Q-connections to the host.

With respect to the aforementioned communications with the fabric controller 110 (i.e., via the communication module 122) such as the registration command 130, the first notification 132, the first response notification 134, such communications may utilize a TCP/IP payload. In this regard, a format for such communications may be designated as neutral network synchronization protocol (NNSP), which may include a header followed by an actual payload.

Figure 2:
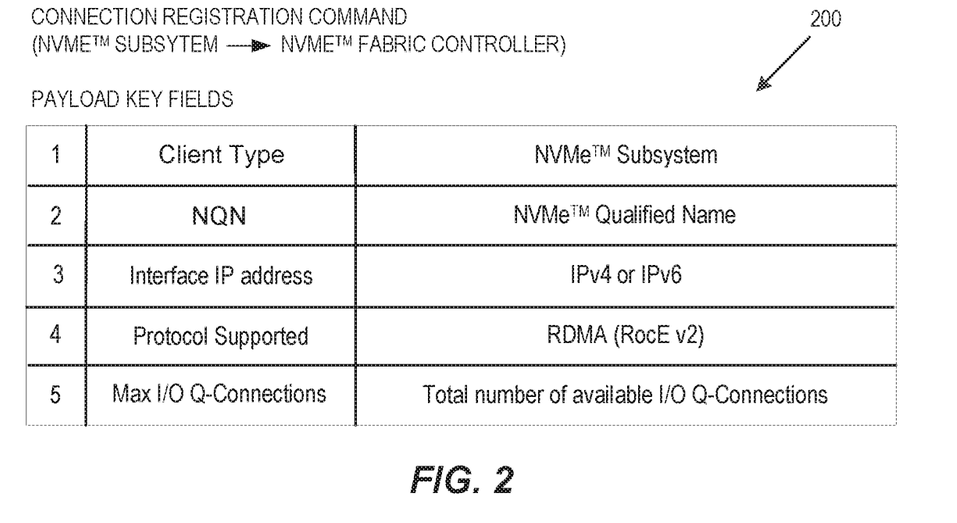
FIG. 2 illustrates payload key fields with respect to a registration command to illustrate operation of the NVMe™ fabric controller of FIG. 1, in accordance with an example.
Figure 3:
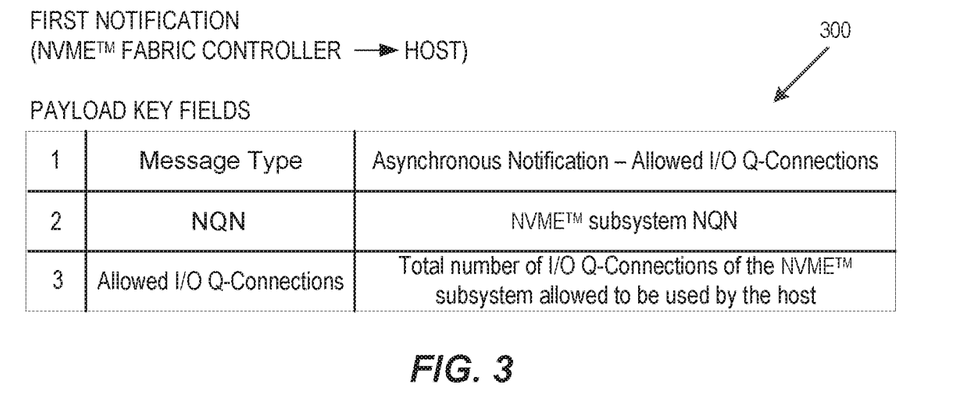
FIG. 3 illustrates payload key fields with respect to a first notification sent from the NVMe™ fabric controller to illustrate operation of the NVMe™ fabric controller of FIG. 1, in accordance with an example.
Figure 4:
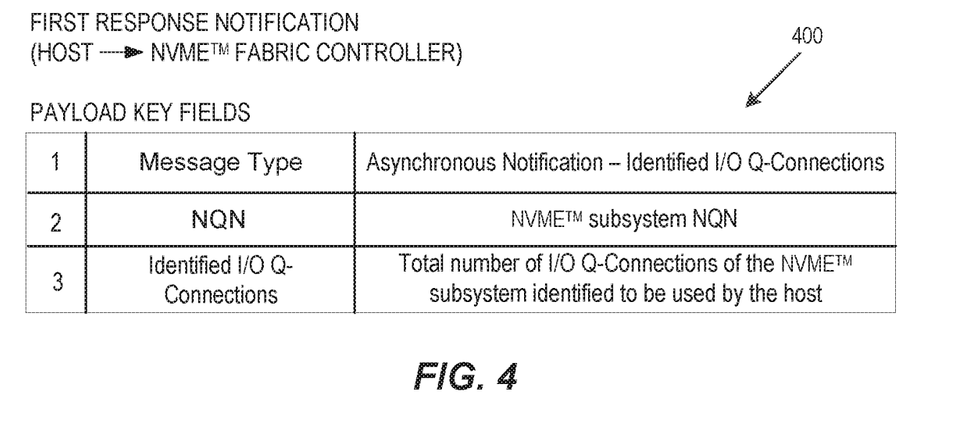
FIG. 4 illustrates payload key fields with respect to a first response notification received with the NVMe™ fabric controller to illustrate operation of the NVMe™ fabric controller of FIG. 1, in accordance with an example.

FIGS. 2-4 illustrate example payload key fields, for communications between the fabric controller 110 and the NVMe™ subsystem 104 and between the fabric controller 110 and each host 102. FIG. 2 illustrates example payload key fields 200 with respect to the registration command 130 (FIG. 1), FIG. 3 illustrates example payload key fields 300 with respect to the first notification 132 (FIG. 1), and FIG. 4 illustrates example payload key fields 400 with respect to the first response notification 134 (FIG. 1).

Referring to FIG. 2, in an example disclosed herein, the payload key fields 200 with respect to registration command 130 sent from the NVMe™ subsystem 104 to fabric controller 110 may include Client type as NVMe™ subsystem, NQN as an NVMe™ Qualified Name, interface IP address as IPv4 or IPv6, Protocol Supported as RDMA (RoCE v2), and Max. I/O Q-Connections as available I/O Q-connections. The payload key fields 200 may be used to maintain a linked database, as well as for distribution purposes as disclosed herein.

Referring to FIG. 3, in an example disclosed herein, the payload key fields 300 with respect to the first notification 132 sent from the fabric controller 110 to a host of the hosts 102 may include Message type as Asynchronous Notification-Allowed I/O Q-Connections, NQN as subsystem NQN, Allowed I/O Q-Connections as total I/O Q-connections of the NVMe™ subsystem allowed to be used by the host. The payload key fields 300 may be used to maintain a linked database, as well as for distribution purposes as disclosed herein.

Referring to FIG. 4, in an example disclosed herein, the payload key fields 400 with respect to the response notification 134 sent from the host to the fabric controller 110 may include Message Type as Asynchronous Notification-Identified I/O Q-Connections, NQN as subsystem NQN, Identified I/O (Q)-Connections as total I/O Q-connections of the NVMe™ subsystem identified to be used by the host. The payload key fields 400 may be used to maintain a linked database, as well as for distribution purposes as disclosed herein.

Figure 5:
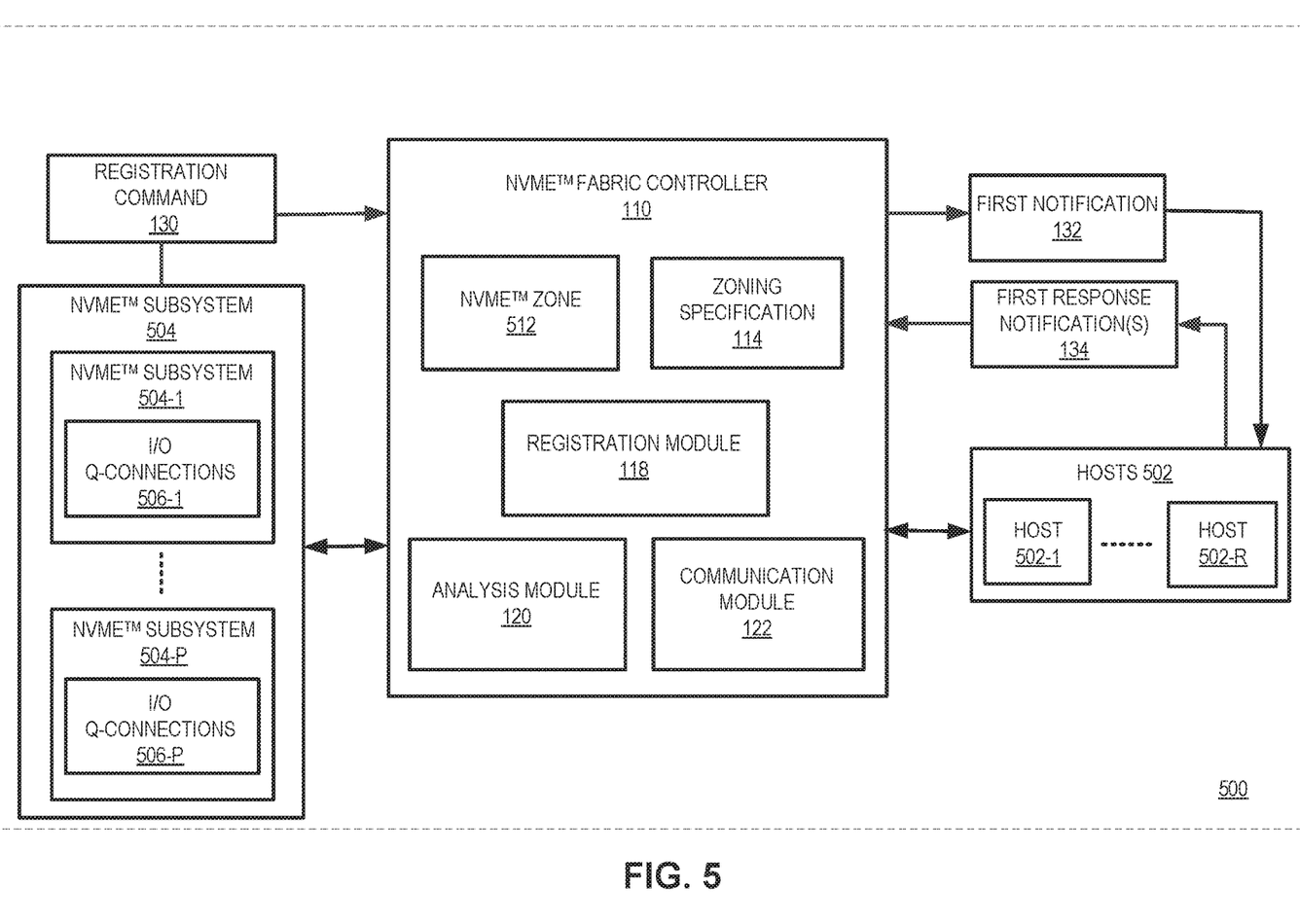
FIG. 5 is a block diagram of a system including a plurality of hosts and a plurality of NVMe™ subsystems, in an NVMe™ zone, connected to an NVMe™ fabric controller, in accordance with an example.

FIG. 5 illustrates a system 500, in accordance with some examples. The system 500 may include certain elements and features similar to those described in FIG. 1 which are marked with similar reference numerals, description of which are not repeated herein. In comparison to FIG. 1, the system 500 illustrated in FIG. 5 may include a plurality of NVMe™ subsystem 504 (designated as NVMe™ subsystem 504-1, . . . NVMe™ subsystem 504-P) and a plurality of hosts 502 (designated as host 502-1, . . . host 502-R) in an NVMe™ zone 512. Within the NVMe™ zone 512, a first subset of hosts of the hosts 502 can communicate with an NVMe™ subsystem 504-1, a second subset of hosts of the hosts 502 can communicate with an NVMe™ subsystem 504-2, and so on. In some examples, a given host of the hosts 502 can communicate with two or more NVMe™ subsystems of the NVMe™ subsystems 504 (i.e., the given host may belong to two or more subsets of the hosts in the NVMe™ zone 512).

In a similar fashion as described in FIG. 1, the fabric controller 110 may receive information including a number of available I/O Q-connections (i.e., 506-1, . . . 506-P), at a point in time, from each NVMe™ subsystem 504. In an example, each NVMe™ subsystem 504 may, individually, send a registration command 130, to the fabric controller 110, to register the number of available I/O Q-connections with the fabric controller 110. The registration command 130, from each NVMe™ subsystem 504, may include information including the number of available I/O (Q)-connections of that NVMe™ subsystem 504 and device parameters (as described above) of that NVMe™ subsystem 504. Once the registration module 118 receives the respective registration commands 130 from the NVMe™ subsystems 504, the registration module 118 may register the respective numbers of available I/O (Q)-connections of the NVMe™ subsystems 504 with the fabric controller 110 and compile the information into a database for further processing by the fabric controller 110.

The analysis module 120 may obtain the information including the respective numbers of available I/O Q-connections of the NVMe™ subsystems 504 from the registration module 118. The analysis module 120 may further determine the numbers of hosts, in the respective subsets of hosts, that can communicate with the NVMe™ subsystems 504. The analysis module 120 may then determine the number of allowed I/O Q-connections of each NVMe™ subsystem 504 to be used by each host of the subset of the hosts (that can communicate with that NVMe™ subsystem) in a similar fashion as described above with respect to FIG. 1. As noted, each host 502 may belong to one or more subsets of the hosts 502. Accordingly, in some examples, the analysis module 120 may create a distribution matrix that includes the number of allowed I/O Q-connections of one or more NVMe™ subsystems of the NVMe™ subsystems 504 to be used by each host 502. An example distribution matrix is shown in Table 1 below.

TABLE 1

| HOSTS/NVMe™ SUBSYSTEMS | NVMe™ SUBSYSTEM 504-1 ($S_1$) | NVMe™ SUSYSTEM 504-2 ($S_2$) | . . . | NVMe™ SUSYSTEM 504-P ($S_P$) |
|---|---|---|---|---|
| HOST 502-1 ($H_1$) | 500, 10 | 4000,10 | . . . | |
| HOST 502-2 ($H_2$) | 500, 10 | | . . . | 1000, 5 |
| . . . | . . . | . . . | . . . | |
| HOST 502-R ($H_R$) | 500, 10 | 4000, 10 | . . . | 1000, 5 |

Based on the distribution matrix, each host 502 may receive, via the first notification 132, the number of I/O Q-connections, of each of the one or more NVMe™ subsystems, that host is allowed to use. For example, based on the example distribution matrix of Table 1, hosts $H_1$, $H_2$ and $H_R$, may receive respective first notifications 132 including the following information:

$$H_1 => (S_1, 50); (S_2, 400) \qquad \text{Equation (i)}$$

$$H_2 => (S_1, 50); (S_P, 200) \qquad \text{Equation (ii)}$$

$$H_R => (S_1, 50); (S_2, 400); (S_P, 200) \qquad \text{Equation (iii)}$$

Equation (i) shows that 50 I/O Q-connections of $S_1$ and 400 I/O (Q)-connections of $S_2$ are allowed to be used by host $H_1$; equation (ii) shows that that 50 I/O Q-connections of $S_1$ and 200 I/O Q-connections of $S_P$ are allowed to be used by host $H_2$; and equation (iii) shows that 50 I/O Q-connections of $S_1$, 400 I/O Q-connections of $S_2$ and 200 I/O Q-connections of $S_P$ are allowed to be used by host $H_R$.

In some examples, the communication module 122 may further send, to each NVMe™ subsystem 504, the number of allowed I/O Q-connections to be used by each host of the subset of hosts that can communicate to the NVMe™ subsystem.

Out of the number of allowed I/O Q-connections of each of the one or more NVMe™ subsystems 504, each host 502 may identify a number of I/O Q-connections (i.e., identified I/O Q-connections) to be used by the host, and send the first response notification 134 to the fabric controller 110. Similar to the process of distribution as described with respect to FIG. 1, the analysis module 120 may determine whether a number of excess I/O connections is available at an NVMe™ subsystem of the NVMe™ subsystems 504 and distribute the number of excess I/O connections among the hosts of the subset of hosts that can communicate with the NVMe™ subsystem. Upon completion of the distribution process, each host 502 may have information including a total number of identified I/O Q-connections of the NVMe™ subsystem(s) 504 to be used by the host. Each host 502 may accordingly send connect commands to establish communication with the total number of identified I/O Q-connections of the NVMe™ subsystem(s) 504.

Figure 6:
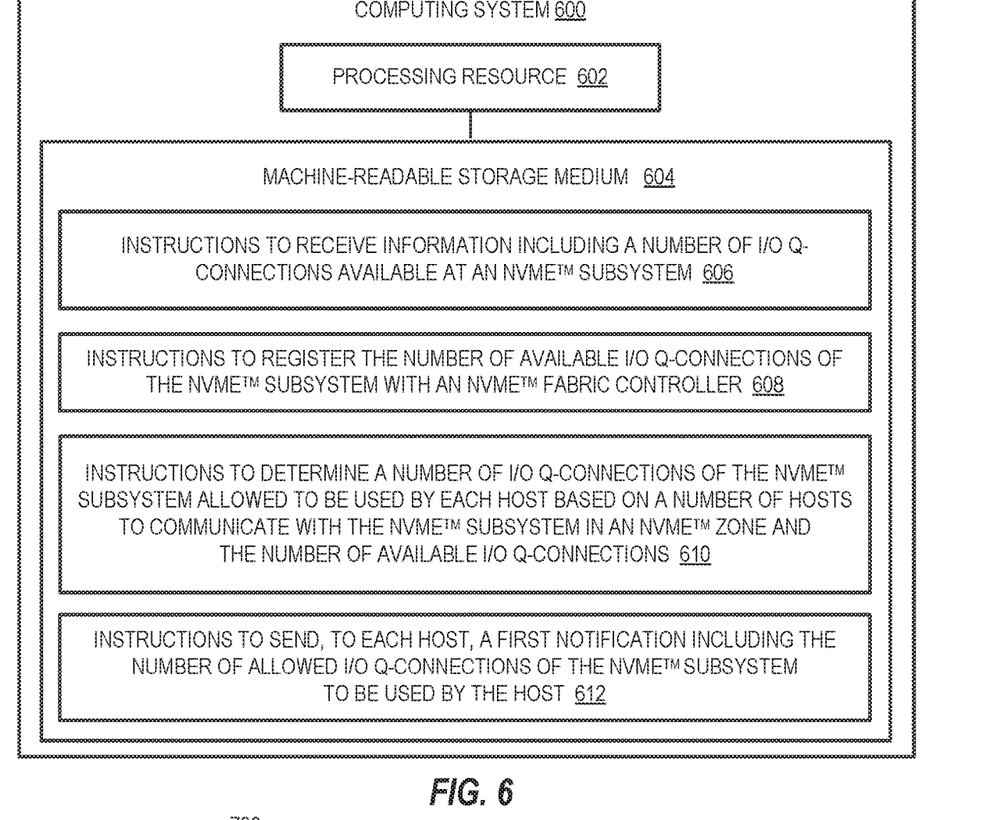
FIG. 6 is a block diagram of a computing system comprising a processing resource and a machine-readable storage medium encoded with example instructions to distribute a number of I/O Q-connections available at an NVMe™ subsystem among a number of hosts, in an NVMe™ zone, in accordance with an example.

FIG. 6 is a block diagram 600 of a computing system 600 including a processing resource 602 and a machine-readable storage medium 604 encoded with example instructions 606, 608 and 610 to distribute I/O Q-connections of an NVMe™ subsystem of a system (e.g., the system 100 of FIG. 1) among hosts that can communicate with the NVMe™ subsystem, in accordance with an example.

In some examples, the machine-readable storage medium 604 may be accessed by the processing resource 602. The processing resource 602 may execute instructions (i.e., programming or software code) stored on the machine-readable storage medium 604. The instructions 606, 608, 610 and 612 of FIG. 6, when executed by the processing resource 602, may implement various aspects of attaining distribution of I/O Q-connections of an NVMe™ subsystem among hosts in a system. In some examples, the computing system 600 may be included in (e.g., as part of) an NVMe™ fabric controller (e.g., the NVMe™ fabric controller 110 of FIG. 1). For ease of illustration, FIG. 6 will be described with reference to FIG. 1. In certain examples, the instructions 606-612 may be executed for performing the functionalities of the fabric controller 110 and one or more methods, such as, the methods 700 and 800 described in FIGS. 7 and 8. In certain examples, as an alternative or in addition to executing the instructions 606-612, the processing resource 602 may include at least one IC, other control logic, other electronic circuitry, or combinations thereof that include a number of electronic components for performing the functionalities described herein as being performed by the fabric controller 110.

Instructions 606, when executed by the processing resource 602, may receive information including the number of available I/O Q-connections of the NVMe™ subsystem 104. In an example, the Instructions 606, when executed by the processing resource 602, may receive the registration command 130 (as described above) from the NVMe™ subsystem 104 to register the number of available I/O Q-connections of the NVMe™ subsystem 104 with the fabric controller 110.

Instructions 608, when executed by the processing resource 602, may register the number of available I/O Q-connections of the NVMe™ subsystem 104 with the fabric controller 110, based on the received information including the number of available I/O Q-connections, from the NVMe™ subsystem 104.

Instructions 610, when executed by the processing resource 602, may determine the number of allowed I/O Q-connections to be used by each host 102 based on the number of hosts 102 and the number of available I/O Q-connections of the NVMe™ subsystem 104.

Instructions 612, when executed by the processing resource 602, may send, to each host 102, the first notification 132 including the number of allowed I/O Q-connections of the NVMe™ subsystem 104 to be used by the host 102.

The instructions 606-612 may include various instructions to execute at least a part of the methods described in FIGS. 7-8 (described later). Also, although not shown in FIG. 6, the machine-readable storage medium 604 may also include additional program instructions to perform various other method blocks described in FIGS. 7 and 8.

Figure 7:
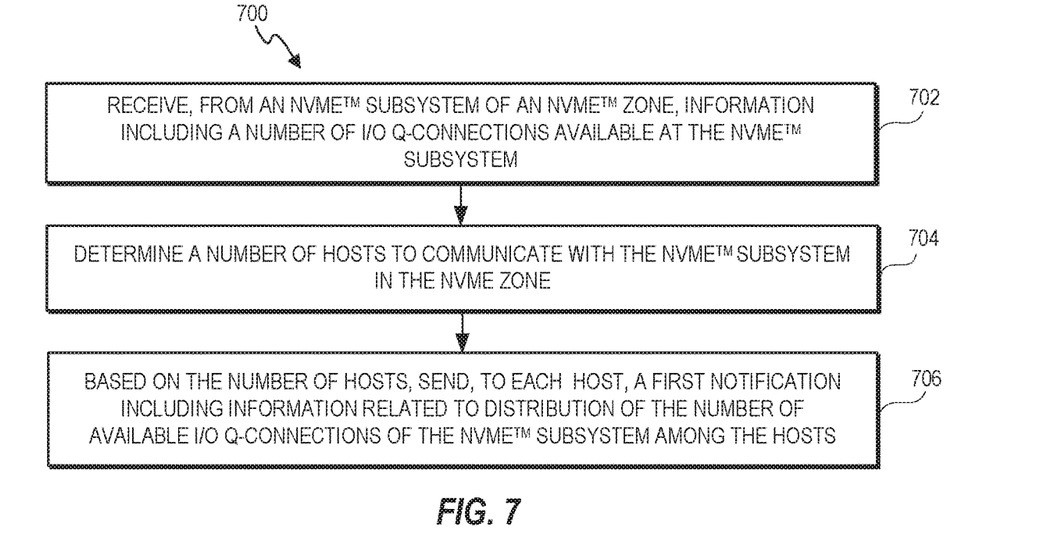
FIG. 7 is a flowchart of a method for distributing a number of I/O Q-connections available at an NVMe™ subsystem among a number of hosts in an NVMe™ zone, in accordance with an example.
Figure 8A:
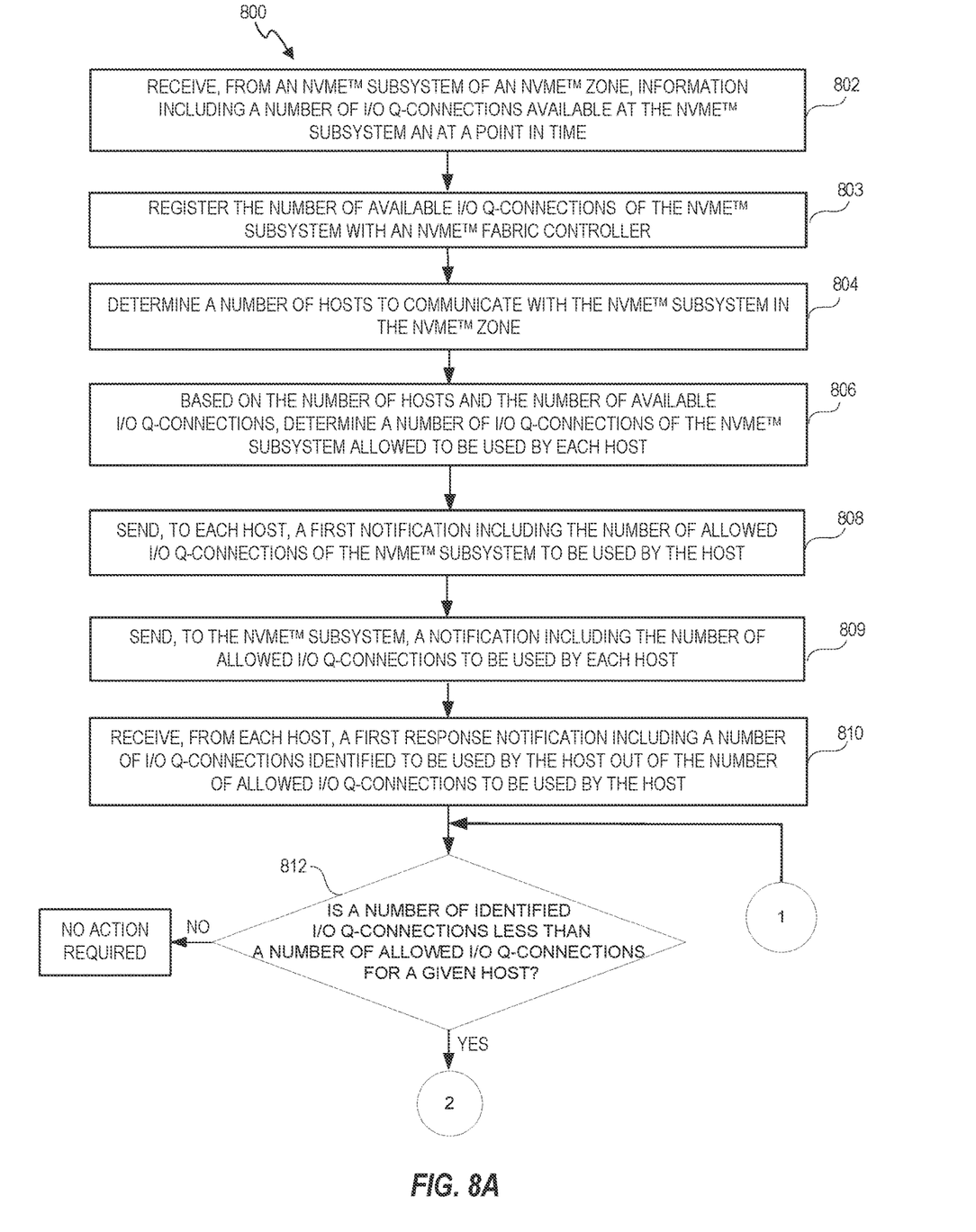
FIGS. 8A and 8B include a flowchart of a method for distributing a number of I/O Q-connections available at an NVMe™ subsystem among a number of hosts in an NVMe™ zone, in accordance with another example.
Figure 8B:
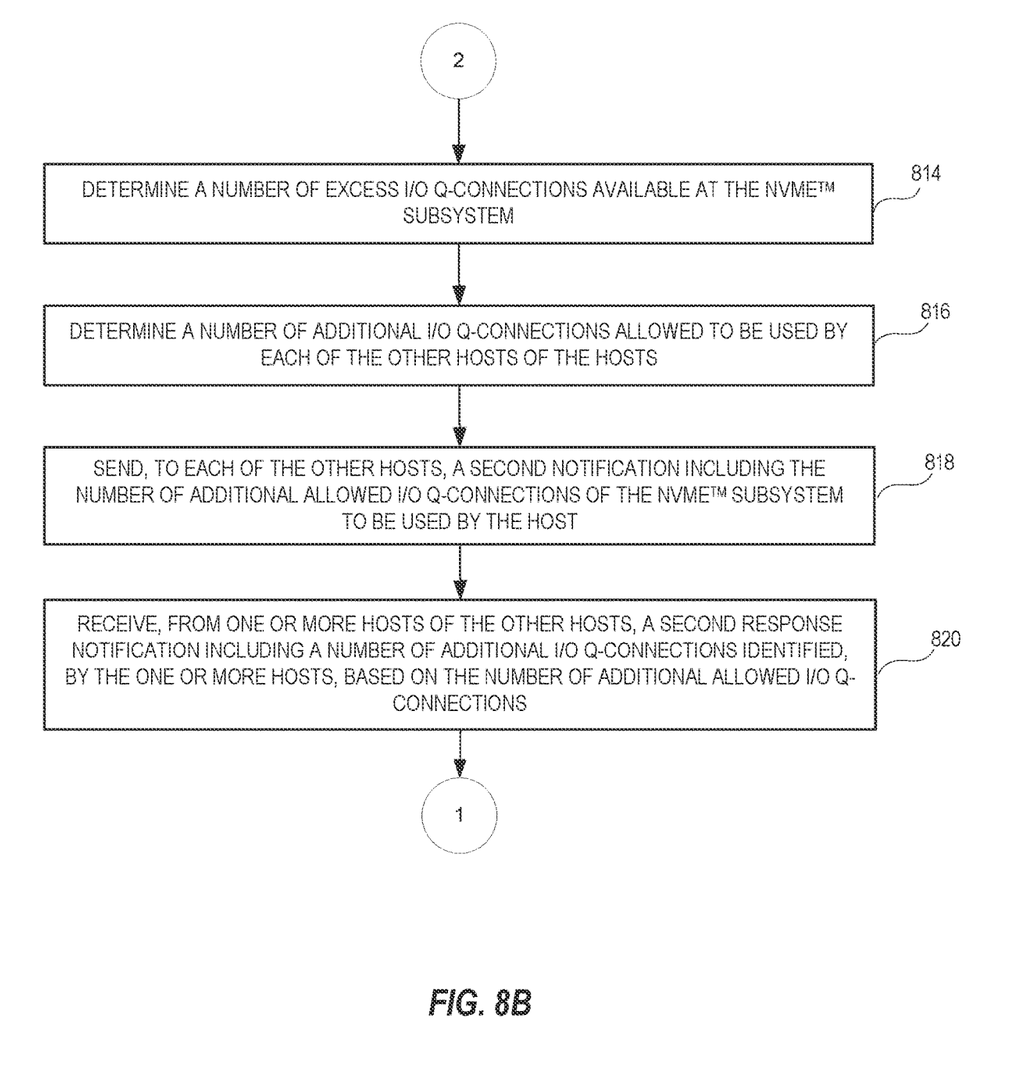

FIGS. 7 and 8 depict flowcharts of example methods 700 and 800 for distributing I/O Q-connections of an NVMe™ subsystem in a system (e.g., the system 100 of FIG. 1). For ease of illustration, the execution of example methods 700 and 800 is described in details below with reference to FIG. 1. Although the below description is described with reference to the fabric controller 110 of FIG. 1, however other applications or devices suitable for the execution of methods 700 and 800 may be utilized. Furthermore, although the below description is described with reference to the NVMe™ subsystem 104 of FIG. 1, however the methods 700 and 800 are applicable to other NVMe™ subsystems of the NVMe™ zone 112 or other NVMe™ zones. In some examples, the methods 700 and 800 may, individually, be executed for each NVMe™ subsystem present in the system 100 to distribute load among the hosts that can communicate with the NVMe™ subsystem. The method steps at various blocks depicted in FIGS. 7 and 8 may be performed by the fabric controller 110. In some examples, the methods 700 and 800, individually, at each such method blocks may be executed by the computing system 600 via the processing resource 602 that executes the instructions 606-612 stored in the non-transitory machine-readable storage medium 604. Additionally, implementation of methods 700 and 800 is not limited to such examples. Although the flowcharts of FIGS. 7 and 8, individually, show a specific order of performance of certain functionalities, methods 700 and 800 are not limited to such order. For example, the functionalities shown in succession in the flowcharts may be performed in a different order, may be executed concurrently or with partial concurrence, or a combination thereof.

In FIG. 7, at block 702, the method 700 may include receiving, from the NVMe™ subsystem 104, information including the number of available I/O Q-connections of the NVMe™ subsystem 104 at a point in time. In an example, the information may further include device parameters of the NVMe™ subsystem 104 such as IP address, MAC address, NQN, or port identification. The fabric controller 110 may receive the information from the NVMe™ subsystem 104. In an example, the method 700 may include receiving the registration command 130 (as described above) to register the number of available I/O Q-connections of the NVMe™ subsystem 104 with the fabric controller 110. In such examples, the fabric controller 110 may register the number of available I/O Q-connections of the NVMe™ subsystem 104, at the point in time, with the fabric controller 110 and compile the information into a database for further processing by the fabric controller 110.

At block 704, the method 700 may include determining a number of the hosts 102 that can communicate with the NVMe™ subsystem 104 in the NVMe™ zone 112. In the examples described herein, the fabric controller 110 may retrieve the number of the hosts 102 from the zone specification 115.

At block 706, the method 700 may include sending, to each host, the first notification 132 including information related to a distribution of the number of available I/O Q-connections of the NVMe™ subsystem 104 among the hosts 102. The first notification 132 may further include the indication of the NQN for the NVMe™ subsystem 104.

The distribution of the number of available I/O Q-connections among the hosts 102 may be determined based on the number of the hosts 102. In an example, the first notification 132 may include the number of available I/O (Q)-connections of the NVMe™ subsystem 104 and the number of the hosts 102 that can communicate with the NVMe™ subsystem 104. In such examples, each host 102 may determine the number of allowed I/O Q-connections by equally distributing the number of available I/O Q-connections of the NVMe™ subsystem 104 among the hosts 102.

In some examples, the method 700 may include determining, by the fabric controller 110, the number of allowed I/O Q-connections to be used by each host 102 by distributing the number of available I/O Q-connections among the hosts 102. In such examples, the first notification 132 may include the number of allowed I/O Q-connections of the NVMe™ subsystem 104 to be used by the host.

Turning now to FIGS. 8A and 8B, the method 800 includes certain blocks that are similar to one or more blocks described in FIG. 7, details of which are not repeated herein for the sake of brevity. By way of example, the blocks 802 and 804 of FIG. 8B are similar to blocks 702 and 704, respectively, of FIG. 7.

At block 802, the method 800 may include receiving, from the NVMe™ subsystem 104, information including a number of available I/O Q-connections of the NVMe™ subsystem 104 at a point in time. At block 803, the method 800 may include registering the number of available I/O Q-connections of the NVMe™ subsystem 104 with the fabric controller 110. At block 804, the method 800 may include determining the number of the hosts 102 that can communicate with the NVMe™ subsystem 104 in the NVMe™ zone 112. At block 806, the method 800 may include determining, by the fabric controller 110, the number of allowed I/O Q-connections to be used by each host 102 by distributing the number of available I/O Q-connections among the hosts 102, based on the number of the hosts 102. At block 808, the method 800 may include sending, to each host, the first notification 132 including the number of allowed I/O Q-connections to be used by the host 102. The first notification 132 may further include the indication of the NQN for the NVMe™ subsystem 104. At block 809, the method 800 may include sending, to the NVMe™ subsystem 104, the subsystem notification including the number of allowed I/O Q-connections to be used by each host 102. The subsystem notification may include the indication of the NQN for each host 102. At block 810, the method 800 may include receiving, from each host 102, the first response notification 134 including the number of identified I/O Q-connections, to be used by the host, out of the number of allowed I/O Q-connections to be used by the host. The first response notification 134, from each host 102, may further include the indication of the NQN of the NVMe™ subsystem 104.

At block 812, the method 800 may include determining whether a number of identified I/O Q-connections to be used by a given host of the hosts 102 is less than a number of allowed I/O Q-connections to be used by the given host. In response to determining that number of identified I/O Q-connections is not less than (i.e., equal to) the number of allowed I/O Q-connections (i.e., 'NO' at block 812), no further action is required.

In response to determining that number of identified I/O Q-connections is less than the number of allowed I/O Q-connections (i.e., 'YES' at block 812), the method 800, at block 814, may include determining the number of excess I/O (Q)-connections available at the NVMe™ subsystem 104. At block 816, the method 800 may include determining the number of additional I/O Q-connections allowed to be used by each of other hosts (except the given host) of the hosts 102 by distributing the excess I/O Q-connections among the other hosts. At block 818, the method may include sending, to each of the other hosts, the second notification including the number of additional allowed I/O Q-connections to be used by the host. The second notification, to each of the other hosts, may include the indication of the NQN of the NVMe™ subsystem 104. At block 820, the method 800 may include receiving, from one or more hosts of the other hosts, the second response notification including the number of additional identified Q-connections based on the number of additional allowed I/O Q-connections. The respective second response notifications from the one or more hosts may include the indication of the NQN of the NVMe™ subsystem 104. The method 800 may repeat the process for determining any excess I/O Q-connection available at the NVMe™ subsystem 104 and determining respective numbers of additional identified I/O Q-connections to be used by the one or more hosts of the hosts 102. Upon completion of the distribution process, each host 102 may have information including a total number of identified I/O Q-connections of the NVMe™ subsystem 104 to be used by the host. Each host may then accordingly send connect commands to establish communication with the total number of identified I/O Q-connections of the NVMe™ subsystem 104.

In some examples, a method may include distributing the number of available I/O Q-connections of the NVMe™ subsystem 104 among host ports of the hosts 102. In such examples, the method may follow similar method blocks as described above with respect to FIGS. 7 and 8 for distributing the I/O (Q)-connections among the host ports, based on a number of host ports of the hosts 102. As compared to FIGS. 7 and 8, the method may include determining a number of allowed I/O Q-connections of the NVMe™ subsystem 104 to be used by each host port based on the number of host ports of the hosts 102.

In examples described herein, functionalities described as being performed by "instructions" may be understood as functionalities that may be performed by those instructions when executed by a processing resource. In other examples, functionalities described in relation to instructions may be implemented by one or more modules, which may be any combination of hardware and programming to implement the functionalities of the module(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 5, fabric controller 110 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

The invention claimed is:

1. A non-volatile memory express (NVMe™) fabric controller, comprising:
   at least one processing resource and a non-transitory machine-readable storage medium comprising instructions executable by the at least one processing resource to:
   receive, from an NVMe™ subsystem of an NVMe™ zone, information comprising a number of I/O Q-connections available at the NVMe™ subsystem at a point in time;
   based on a number of hosts to communicate with the NVMe™ subsystem in the NVMe™ zone and the number of available I/O Q-connections at the point in time, determine a number of I/O Q-connections of the NVMe™ subsystem allowed to be used by each host; and
   send, to each host, a first notification comprising the number of allowed I/O Q-connections to be used by the host.

2. The NVMe™ fabric controller of claim 1, wherein the information further comprises an indication of:
   an NVMe™ qualified name (NQN) for the NVMe™ subsystem; and
   an IP address associated with the NQN for the NVMe™ subsystem.

3. The NVMe™' fabric controller of claim 1, wherein the instructions comprise instructions executable by the at least one processing resource to:
   register the number of available I/O Q-connections of the NVMe™ subsystem with the NVMe™ fabric controller.

4. The NVMe™ fabric controller of claim 1, wherein the instructions to determine the number of I/O Q-connections of the NVMe™ subsystem allowed to be used by each host comprise instructions to distribute the number of available I/O Q-connections among the hosts.

5. The NVMe™ fabric controller of claim 1, wherein the first notification comprises an indication of an NQN for the NVMe™ subsystem.

6. The NVMe™ fabric controller of claim 1, wherein the instructions comprise instructions executable by the at least one processing resource to:
   send, to the NVMe™ subsystem, a notification comprising the number of allowed I/O Q-connections to be used by each host.

7. The NVMe™ fabric controller of claim 6, wherein the notification comprises an indication of an NQN for each host.

8. The NVMe™ fabric controller of claim 1, wherein the instructions comprise instructions executable by the at least one processing resource to:
   in response to sending the first notification, receive, from each host, a first response notification comprising a number of I/O Q-connections of the NVMe™ subsystem identified to be used by the host based on the number of allowed I/O Q-connections to be used by the host.

9. The NVMe™ fabric controller of claim 8, wherein the instructions comprise instructions executable by the at least one processing resource to:
   upon receiving the first response notification, determine whether the number of identified I/O Q-connections to be used by a given host is less than the number of allowed I/O Q-connections to be used by the given host to determine a number of excess I/O Q-connections available at the NVMe™ subsystem;
   upon determining the number of excess I/O Q-connections available at the NVMe™ subsystem, determine a number of additional I/O Q-connections allowed to be used by each of other hosts of the hosts based on the number of excess I/O Q-connections available at the NVMe™ subsystem;
   send, to each of other hosts, a second notification comprising the number of additional allowed I/O connections to be used by the host; and
   in response to the second notification, receive, from one or more hosts of the other hosts, a second response notification comprising a number of additional I/O Q-connections identified to be used by each of the one or more hosts based on the number of additional allowed I/O Q-connections to be used by the host.

10. A non-transitory machine readable medium comprising instructions executable by at least one processing resource to:
register a number of I/O Q-connections available at an NVMe™ subsystem of an NVMe™ zone with an NVMe™ fabric controller based on information received from the NVMe™ subsystem, wherein the information comprises the number of available I/O Q-connections of the NVMe™ subsystem at a point in time;
based on a number of hosts to communicate with the NVMe™ subsystem in the NVMe™ zone and the number of available I/O Q-connections at the point in time, determine a number of I/O Q-connections of the NVMe™ subsystem allowed to be used by each host; and
send, to each host, a first notification comprising the number of owed I/O Q-connections to be used by the host.

11. A method, comprising:
with an NVMe™ fabric controller, receiving, from an NVMe™ subsystem of an NVMe™ zone, information comprising a number of I/O Q-connections available at the NVMe™ at a point in time;
with the NVMe™ fabric controller, determining a number of hosts to communicate with the NVMe™' subsystem in the NVMe™ zone; and
with the NVMe™ fabric controller, based on the number of hosts to communicate with the NVMe™ subsystem in the NVMe™ zone, sending, to each host, a first notification comprising information related to distribution of the number of available I/O Q-connections of the NVMe™ subsystem among the hosts.

12. The method of claim 11, wherein the information further comprises an indication of:
an NVMe™ qualified name (NQN) for the NVMe™ subsystem; and
an IP address associated with the NQN for the NVMe™ subsystem.

13. The method of claim 11, further comprising:
registering the number of available I/O Q-connections of the NVMe™ subsystem with the NVMe™ fabric controller.

14. The method of claim 11, wherein the first notification comprises the number of available I/O Q-connections of the NVMe™ subsystem and the number of hosts to communicate with the NVMe™ subsystem in the NVMe™ zone.

15. The method of claim 11, further comprising determining a number of I/O Q-connections of the NVMe™ subsystem allowed to be used by each host by distributing the available I/O Q-connections of the NVMe™ subsystem among the hosts, and wherein the first notification comprises the number of allowed I/O (Q)-connections of the NVMe™ subsystem to be used by the host.

16. The method of claim 11, wherein the first notification further comprises an indication of an NQN for the NVMe™ subsystem.

17. The method of claim 11, further comprising:
with the NVMe™ fabric controller, sending, to the NVMe™ subsystem, a notification comprising the number of allowed I/O Q-connections to be used by each host.

18. The method of claim 17, wherein the notification comprises an indication of an NQN for each host.

19. The method of claim 11, further comprising:
with the NVMe™ fabric controller, receiving, from each host, a first response notification in response to sending the first notification, wherein the first response notification comprises a number of I/O Q-connections of the NVMe™ subsystem identified to be used by the host based on the number of allowed I/O Q-connections of the NVMe™ subsystem to be used by the host.

20. The method of claim 19, further comprising:
upon receiving the first response notification, determining, with the NVMe™ fabric controller, whether the number of identified I/O Q-connections to be used by a given host of the hosts is less than the number of allowed I/O Q-connections to be used by the given host to determine a number of excess I/O Q-connections available at the NVMe™ subsystem;
upon determining the number of excess I/O Q-connections available at the NVMe™ subsystem, determining, with the NVMe™ fabric controller, a number of additional I/O Q-connections allowed to be used by each of other hosts of the hosts based on the number of excess I/O Q-connections available at the NVMe™ subsystem;
with the NVMe™ fabric controller, sending, to each of the other hosts, a second notification comprising the number of additional allowed I/O Q-connections to be used by the host; and
with the NVMe™ fabric controller, receiving, from one or more hosts of the other hosts, a second response notification comprising a number of additional I/O Q-connections identified to be used by each of the one or more hosts based on the number of additional allowed I/O Q-connections to be used by the host.

* * * * *